US007650376B1

(12) United States Patent
Blumenau

(10) Patent No.: US 7,650,376 B1
(45) Date of Patent: Jan. 19, 2010

(54) CONTENT DISTRIBUTION SYSTEM FOR DISTRIBUTING CONTENT OVER A NETWORK, WITH PARTICULAR APPLICABILITY TO DISTRIBUTING HIGH-BANDWIDTH CONTENT

(76) Inventor: Trevor I. Blumenau, 1800 Pacific Ave., #505, San Francisco, CA (US) 94109

( * ) Notice: Subject to any disclaimer, the term of this patent is extended or adjusted under 35 U.S.C. 154(b) by 1357 days.

(21) Appl. No.: 09/717,184

(22) Filed: Nov. 20, 2000

Related U.S. Application Data

(60) Provisional application No. 60/192,165, filed on Mar. 27, 2000.

(51) Int. Cl.
*G06F 15/16* (2006.01)
(52) U.S. Cl. .................. 709/203; 709/217; 709/226; 707/10
(58) Field of Classification Search .......... 709/217, 709/218–219, 203, 226; 707/10
See application file for complete search history.

(56) References Cited

U.S. PATENT DOCUMENTS

| | | | |
|---|---|---|---|
| 5,515,098 A | 5/1996 | Carles | 348/8 |
| 5,661,516 A | 8/1997 | Carles | 348/8 |
| 5,778,187 A | 7/1998 | Monteiro et al. | 709/231 |
| 5,815,793 A | 9/1998 | Ferguson | 455/3.1 |
| 5,862,339 A * | 1/1999 | Bonnaure et al. | 709/227 |
| 5,892,535 A | 4/1999 | Allen et al. | 348/9 |
| 5,956,716 A * | 9/1999 | Kenner et al. | 709/217 |
| 5,991,809 A | 11/1999 | Kriegsman | 709/226 |
| 6,003,030 A | 12/1999 | Kenner et al. | 707/10 |
| 6,075,551 A | 6/2000 | Berezowski et al. | 348/9 |
| 6,112,243 A | 8/2000 | Downs et al. | 709/226 |
| 6,134,588 A * | 10/2000 | Guenthner et al. | 709/226 |
| 6,182,125 B1 * | 1/2001 | Borella et al. | 709/218 |

(Continued)

FOREIGN PATENT DOCUMENTS

EP 0959601 11/1999

(Continued)

OTHER PUBLICATIONS

Weber, Thomas E., "Maverick Programmers Prepare to Unleash Anarchy on the Web," Wall Street Journal, Mar. 27, 2000, 1 page.

(Continued)

*Primary Examiner*—Philip B Tran
(74) *Attorney, Agent, or Firm*—David R. Graham

(57) ABSTRACT

The invention facilitates the distribution of content over a network (e.g., the Internet, a television network) and, in particular, the distribution of high-bandwidth (i.e., data intensive) content, such as video content or customized content. At least one of the sites of the network (a "core server") is controlled (at least in part) by an entity that desires to distribute content to one or more other network sites ("client(s)") at which the content is to be used. In accordance with the invention, a core server uses one or more other network sites ("node server(s)") to distribute content on behalf of the core server to one or more clients. In particular, in accordance with one embodiment of the invention, the entit(ies) having control (at least in part) of each of one or more network sites (node server(s)) can be recruited to use their site(s) to distribute content on behalf of a core server to one or more clients.

123 Claims, 2 Drawing Sheets

U.S. PATENT DOCUMENTS

| | | | |
|---|---|---|---|
| 6,356,947 B1 * | 3/2002 | Lutterschmidt | 709/231 |
| 6,389,462 B1 * | 5/2002 | Cohen et al. | 709/231 |
| 6,434,610 B1 * | 8/2002 | Wahl | 709/219 |
| 6,510,469 B1 * | 1/2003 | Starnes et al. | 709/203 |
| 6,553,218 B1 * | 4/2003 | Boesjes | 455/406 |
| 6,704,781 B1 | 3/2004 | Einarson et al. | 709/223 |
| 6,731,612 B1 * | 5/2004 | Koss | 370/310 |
| 6,792,615 B1 * | 9/2004 | Rowe et al. | 725/37 |
| 6,799,214 B1 * | 9/2004 | Li | 709/226 |
| 6,832,253 B1 * | 12/2004 | Auerbach | 709/226 |
| 7,010,578 B1 | 3/2006 | Lowin et al. | 709/217 |
| 2002/0026560 A1 | 2/2002 | Jordan et al. | 711/120 |

FOREIGN PATENT DOCUMENTS

| | | |
|---|---|---|
| WO | WO 98/18076 | 4/1998 |
| WO | WO 99/40514 | 8/1999 |
| WO | WO 00/04458 | 1/2000 |

OTHER PUBLICATIONS

Shankland, Stephen, "Buddy, Can You Spare Some Processing Time?," http://news.cnet.com/news/0-1003-200-2571550.html, Sep. 1, 2000, 3 pages.

Brown, Janelle, "Did AOL Eat Gnutella for Lunch?," http://www.salon.com/tech/log/2000/03/15/gnutella/index.html, Mar. 15, 2000, 4pages.

"What is Gnutella?," http://gnutella.wego.com, Aug. 21, 2000, 4 pages.

"Client as Server: The New Model," Apr. 16-19, 2000, Andover.net, 18 pages.

Borland, John et al., "The P2P Myth: Business, bandwidth may dash hopes of a peer-to-peer utopia," http://news.cnet.com/news/0-1005-201-3248711-0.html, Oct. 26, 2000, 2 pages.

Yamamoto, Mike et al., "The P2P Myth: A brave new—or old—world?," http://news.cnet.com/news/0-1005-201-3248711-1.html, Oct. 26, 2000, 5 pages.

Borland, John, "The P2P Myth: Democracy's traffic jams," http://news.cnet.com/news/0-1005-201-3248711-2.html, Oct. 26, 2000, 4 pages.

Borland, John., "The P2P Myth: Show me the money," http://news.cnet.com/news/0-1005-201-3248711-3.html, Oct. 26, 2000, 3 pages.

Grice, Corey, "The P2P Myth: Harnessing the PC's power," http://news.cnet.com/news/0-1005-201-3248711-4.html, Oct. 26, 2000, 3 pages.

James D. Guyton et al., "Locating Nearby Copies of Replicated Internet Servers," Computer Communication Review, vol. 25, No. 4, Oct. 1, 1995, pp. 288-298.

* cited by examiner

CONTENT DISTRIBUTION SYSTEM FOR DISTRIBUTING CONTENT OVER A NETWORK, WITH PARTICULAR APPLICABILITY TO DISTRIBUTING HIGH-BANDWIDTH CONTENT

CROSS-REFERENCE TO RELATED APPLICATION

This application is a continuation-in-part of U.S. provisional patent application Ser. No. 60/192,165, entitled "Content Distribution System for Distributing Content over a Network, with Particular Applicability to Distributing High-Bandwidth Content," by Trevor I. Blumenau, filed on Mar. 27, 2000, the disclosure of which is hereby incorporated by reference herein.

BACKGROUND OF THE INVENTION

1. Field of the Invention

This invention relates to the provision of content over a network by a content provider. In particular, the invention relates to the provision over a network of high-bandwidth content and to the provision of content over a network by enlisting one or more network sites to facilitate the distribution of content on behalf of a content provider.

2. Related Art

An ongoing problem for content delivery networks is the delivery of high-bandwidth content in a satisfactory manner. High-bandwidth content is any content that requires relatively (as compared to the bandwidth capabilities of the network) large data transmission rates in order to effect transmission of the content within an acceptable period of time. High-bandwidth content can be, for example, a single set of data intensive content (e.g., video content, three-dimensional visual still images). High-bandwidth content can also be multiple sets of content that are to be transmitted at the same time (e.g., customized content) so that, together, the sets of content are data intensive.

For example, as discussed in U.S. patent application Ser. No. 09/144,369, entitled "Ameliorating Bandwidth Requirements for the Simultaneous Provision of Multiple Sets of Content over a Network," filed on Aug. 31, 1998, by Trevor I. Blumenau, the disclosure of which is incorporated by reference herein, delivering individualized or customized content (different streams of data delivered at the same time and/or the same stream of data delivered at different, but overlapping, times) to many content users across a network (e.g., the Internet) is extremely challenging. Delivery of such content can be facilitated by strategically placing a multiplicity of servers at key places (nodes) in the topology of the network to allow for "hand-offs." For example, in one system for distributing low-bandwidth content over the Internet to a very large number of people, several servers on which copies of the content are stored have been connected worldwide at different nodes on the Internet to effect distribution of the content.

Video content is typically data intensive (even more so as the quality of the video increases). A single set of video content can be high-bandwidth content. For example, delivering full video streams to large audiences on the Internet (or similar network) so far has been impossible. Existing systems for delivery of video streams over the Internet suffer from undesirable limitations. For example, CNN distributes video streams over the Internet, but the video streams are limited to a pixel resolution of less than 320×240 and the video streams include only very short clips using very low frame rates. Some Web sites have broadcasted video streams over the Internet, but, again, the frame size is small and the frame rate low. Additionally, those Web sites have not delivered customized video content (in terms of either the time of delivery— i.e., video on demand—or the actual content delivered).

SUMMARY OF THE INVENTION

In accordance with the invention, the distribution of content (in particular, data intensive content such as video content) by a content provider over a network (e.g., a computer network such as the Internet, a television network) is facilitated by making use of network site(s) throughout the network to dispense some part or all of the content on behalf of the content provider to network site(s) that desire to receive the content. In particular, the invention can be used to facilitate the distribution of content over a network by recruiting network site(s) to act as volunteer server(s) for dispensing content on behalf of the content provider. The invention can be used, for example, to facilitate the distribution of a single set of high-bandwidth content, e.g., facilitate distribution of video content over the Internet. The invention can also be used, for example, to facilitate the distribution of multiple sets of content at the same time, e.g., facilitate distribution of customized content to different content users.

In one embodiment of the invention, the provision of content over a network is effected by 1) receiving a request from a client for specified content; 2) communicating to the client the identity of a node server having the specified content stored thereon, thereby enabling the client to request transmission of the specified content from the node server; and 3) ascertaining that the node server transmitted the specified content to the client, wherein an owner of the node server is offered an incentive as compensation for transmission of the specified content to the client.

In another embodiment of the invention, the provision of content over a network is effected by 1) receiving a request for content from a client; 2) determining the location of the client within the network; 3) identifying the location of a plurality of node servers within the network that have at least part of the requested content stored thereon; 4) selecting from the plurality of node servers one or more candidate node servers that are determined to be topologically proximate to the client; and 5) communicating the identity of the candidate node servers to the client to enable the client to request transmission of the requested content via the network from one or more of the candidate node servers.

In yet another embodiment of the invention, the provision of content over a network is effected by 1) identifying which of a plurality of sets of content or parts of the plurality of sets of content are stored by each of a plurality of node servers that are part of the network (wherein at least one of the plurality of sets of content or parts of the plurality of sets of content is stored on redundant node servers); 2) receiving a request from a client that is part of the network for transmission of a set of content to the client (wherein at least part of the requested set of content is stored on redundant node servers); 3) selecting from the plurality of node servers one or more candidate node servers that have stored thereon at least part of the requested set of content; and 4) communicating the identity of the candidate node servers to the client to enable the client to request transmission of the requested content via the network from one or more of the candidate node servers.

In still another embodiment of the invention, the provision of content over a television network is effected by 1) identifying which of a plurality of sets of content or parts of the plurality of sets of content are stored by each of a plurality of node server television set-top boxes that are part of the network; 2) receiving a request from a client television set-top box that is part of the network for transmission of a set of content to the client television set-top box (wherein at least part of the requested set of content is stored on one or more node server television set-top boxes); 3) selecting from the one or more node server television set-top boxes one or more candidate node server television set-top boxes; and 4) communicating the identity of the candidate node server television set-top boxes to the client television set-top box to enable the client television set-top box to request transmission of the requested content via the network from one or more of the candidate node server television set-top boxes.

DETAILED DESCRIPTION OF THE INVENTION

Figure 1:
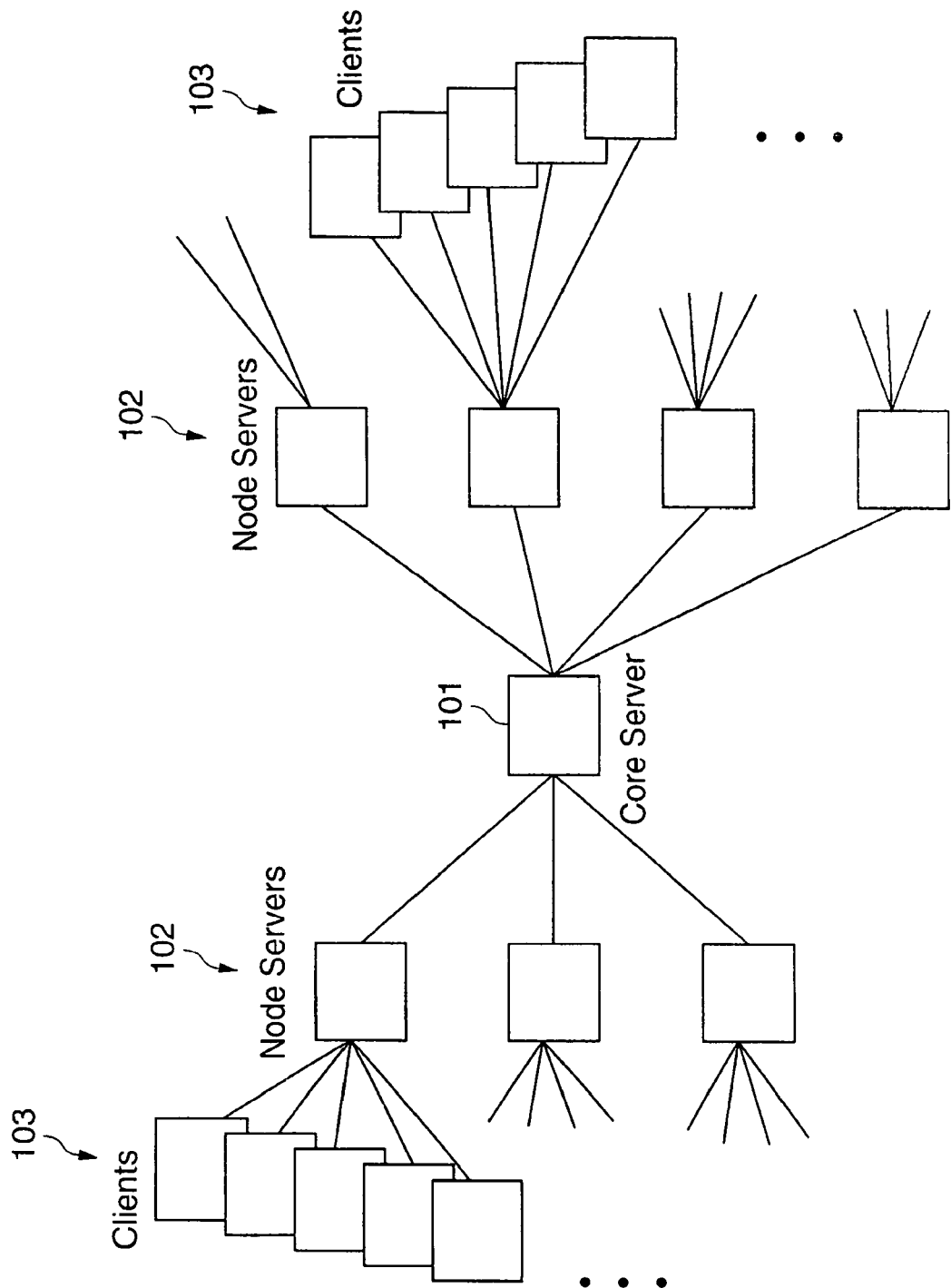
FIG. 1 illustrates a system in accordance with the invention.

The invention facilitates the distribution of content over a network (e.g., the Internet, a television network) and, in particular, the distribution of high-bandwidth (i.e., data intensive) content, such as video content or customized content. The network includes multiple network sites (which can each be comprised of one or more devices) linked together to enable communication therebetween. (Herein, in accordance with conventional usage, the terms "network site" and "node" are used interchangeably. It should be noted, however, that the term "node server," as used herein, has a particular meaning, as discussed below.) At least one of the network sites (a "core server") is controlled (at least in part) by an entity that desires to distribute content to one or more other network sites ("client(s)") at which the content is to be used. (Herein, "use" of content includes, for example, observation of content, which in turn includes, for example, viewing and/or listening to content, such as viewing a movie or other audiovisual program. "Use" of content can also include other types of interaction with content, such as operation of a computer program.) In accordance with the invention, a core server uses one or more other network sites ("node server(s)") to distribute content on behalf of the core server to one or more clients. (It is to be understood that usage of the terms "core server," "node server," and "client" herein to describe network sites in a system according to the invention does not limit those network sites to roles that are conventionally associated in the computer science arts with the terms "client" and "server.") In particular, in accordance with one embodiment of the invention, the entit(ies) having control (at least in part) of each of one or more network sites (node server(s)) can be recruited to use their site(s) to distribute content on behalf of a core server to one or more clients. (For convenience, an entity that controls a core server, node server or client is referred to hereinafter as, respectively, a "core server owner," a "node server owner" or a "client owner," though such an entity need not necessarily own the core server, node server or client, but only, to some extent, exercise control over the operation of the core server, node server or client.)

By using other sites on a network (node servers) as servers from which to distribute content on behalf of a core server, a very powerful system for distribution of content (and, in particular, high-bandwidth content) over a network is created. For example, it may not be possible to distribute high-bandwidth content (e.g., video content) from a single network site so that the content is delivered rapidly enough to another network site to produce a satisfying experience for the content user (e.g., viewer) at that network site. The invention can be used to facilitate the distribution of a single set of data intensive content over a network, e.g., any type of video content distribution on the Internet. (Herein, "video content" can include any type of visual content including moving images.) The invention can be used to facilitate the distribution of a single set of data intensive content by, for example, causing the content to be provided from a network site that is topologically proximate to the content user's network site and/or by causing different parts of the content to be delivered to the content user's network site from multiple different network sites. Similarly, it may not be possible to simultaneously distribute multiple sets of content (e.g., different versions of a set of content) from a single network site so that the sets of content are delivered rapidly enough to corresponding network sites to produce satisfying experiences for the content users at those network sites. (The delivery of multiple sets of content that are distributed simultaneously need not necessarily begin and end at the same time.) The invention can be used to facilitate the simultaneous distribution of multiple sets of content over a network, e.g., provision of individualized content (such as advertisements) during a broadcast program (live or delayed), distribution of a video program in a television network video-on-demand system (in which the same video program may be requested for delivery at different, but overlapping, times). The invention can be used to facilitate the simultaneous distribution of multiple sets of content by, for example, causing sets of content to be provided simultaneously from multiple network sites. As illustrated by the foregoing examples, the invention facilitates the distribution of high-bandwidth content so that a satisfying user experience is produced.

In one particularly advantageous aspect of the invention, the owner of a site on the network can be provided with one or more incentives to make that network site a node server. Such incentives can include, for example, access to premium content from the core server (or other content providing site), access to free content from a content providing site (e.g., a free movie, free software, a free software upgrade), access to content that has been modified in a desirable way (e.g., content without advertising), loyalty program credits (e.g., frequent flyer miles), cash, or some combination of such incentives. However, as can be readily understood, the invention contemplates the use of any incentive or combination of incentives to induce a network site owner to allow their site to be used as a node server.

Generally, the invention can be used to distribute any type of content which can be "used" by a client owner in any of a variety of different manners. For example, the invention can be used to distribute computer program(s). The invention can also be used to distribute visual, audio or audiovisual content (e.g., movie(s), advertisement(s), three-dimensional visual still image(s), radio program(s), multimedia content). The invention can also be used to distribute large design files (e.g., CAD files). To illustrate the principles of the invention, the description of the invention below is sometimes given with respect to embodiments of the invention in which a content provider distributes video programs (e.g., movies) over a network to viewers. Those skilled in the art will readily appreciate, in view of such description, how to implement the invention to distribute other types of content.

In general, the invention can be implemented using any content distribution network. For example, the invention can be implemented to facilitate distribution of content over a computer network such as the Internet (and, in particular, the World Wide Web portion of the Internet). The invention can also be implemented, for example, to facilitate distribution of content over a television network (e.g., conventional television networks, cable television networks, digital television networks, satellite television networks).

FIG. 1 illustrates a system 100 in accordance with the invention. The system 100 includes three components: a core server 101, node servers 102 and clients 103. The core server 101, node servers 102 and clients 103 are interconnected with one another to form a network. FIG. 1 is a simplified illustration of a system in accordance with the invention; typically, the relationships between network sites—both physical (topological) connections and client-server roles—are more complicated than shown in FIG. 1. Further, a single network site can operate in multiple capacities. For example, a single network site can receive content for observation or other use (i.e., act as a client) or can distribute content to other sites (i.e., act as a node server). Additionally, for simplicity and to facilitate explanation and illustration of the invention, only a single core server is shown in FIG. 1; however, a network with which the invention is implemented can (and often will) include multiple core servers.

Figure 2:
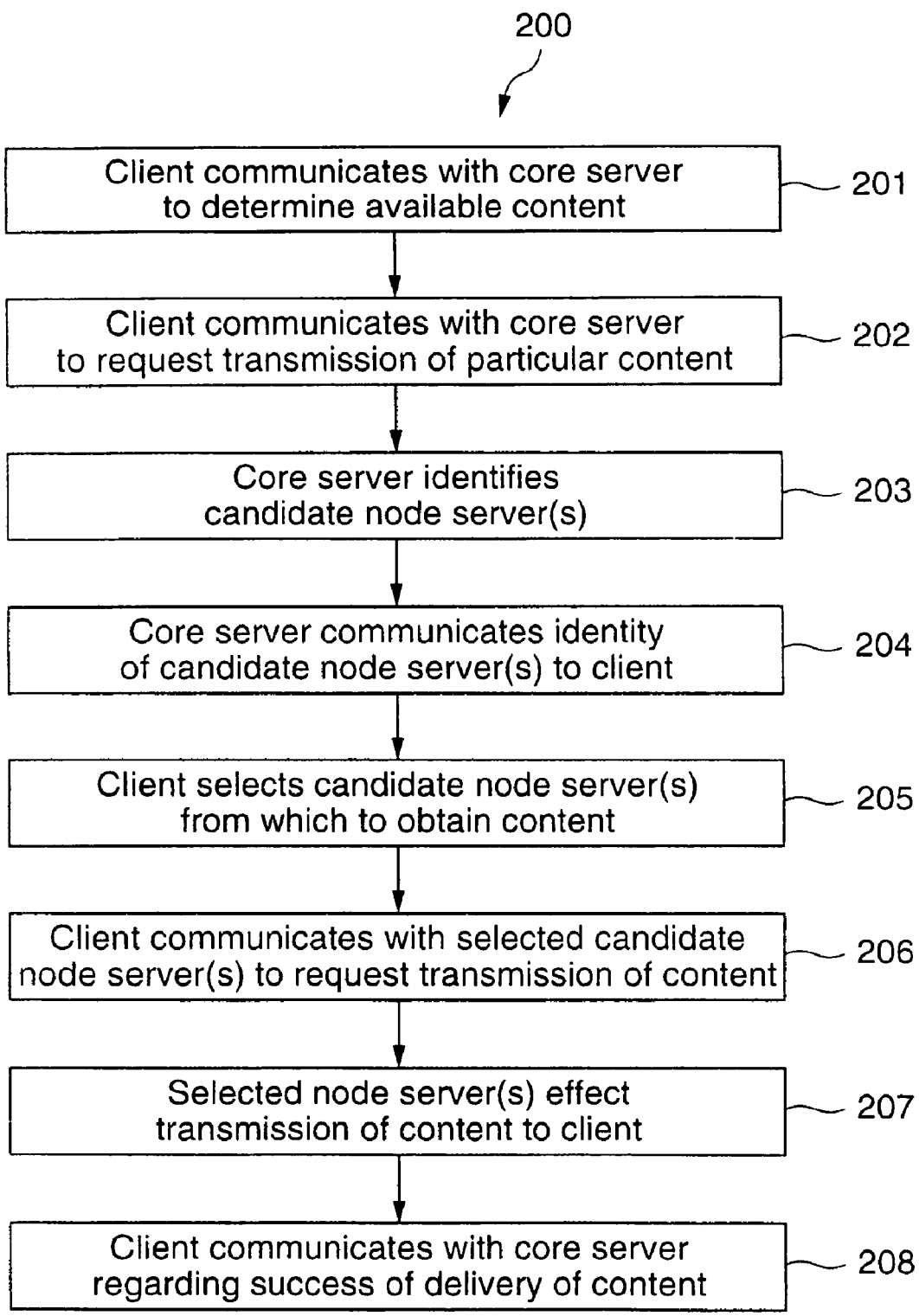
FIG. 2 is a flow chart of a method for distributing content over a network in accordance with the invention.

FIG. 2 is a flow chart of a method 200 for distributing content over a network in accordance with the invention. The method 200 illustrates one particular way in which the invention can be implemented. Those skilled in the art will readily appreciate modifications that can be made to the method 200 while still producing the functionality of the invention as described herein, particularly in view of the detailed description of aspects of the invention below.

In step 201, a client communicates with a core server to determine what content is available for transmission to the client. The core server provides an identification of the available content to the client in response to a request from the client. For example, if the core server is used to implement an on-line video store, the client can communicate with the core server to obtain a list of movies that are available to buy or rent.

In step 202, the client communicates with the core server to request transmission of particular content. Typically, the client will also specify at the same time when the client desires to have the requested content delivered. For example, a client may, in the morning or afternoon, request transmission of a movie from an on-line video store for viewing at 8:00 P.M. that evening.

In step 203, after receiving a request from a client for transmission of particular content, the core server identifies one or more node servers ("candidate node server(s)") from which the client can obtain some part or all of the requested content. (The invention can be implemented so that the core server can itself provide some part or all of the content requested by a particular client.) In particular, the invention can advantageously be implemented so that the core server reviews a network topology database and selects candidate node server(s) based on an analysis of the topological relationship between the client and node servers (and the core server, if the invention is so implemented) having some part or all of the requested content stored thereon. For example, as described in more detail below, the core server can determine the topological proximity to the client of node servers (and, perhaps, the core server) having some part or all of the requested content stored thereon and select as candidate node server(s) those node server(s) that are most topologically proximate to the client, as determined in accordance with a specified criterion or criteria. Delivery of content from network sites that are most topologically proximate to the client network site can improve content delivery performance. This is so, for example, because content is less likely to encounter bottlenecks in the network when being transmitted from node server(s) that are relatively topologically proximate to the client than when being transmitted from node server(s) that are not relatively topologically proximate to the client. Additionally, transmitting the content from node server(s) that are relatively topologically proximate to the client reduces the likelihood that the content will create a bottleneck in another part of the network. Further, the cost of transmitting content from a topologically proximate node server to a client is typically less expensive than transmitting that content from a node server that is not topologically proximate. The content, creation and maintenance of a topological database, and the use of the topological database to select candidate node server(s), are described in more detail below.

In step 204, the core server communicates the identity of the candidate node server(s) to the client. For example, the core server can send the client a list of network addresses of candidate node server(s).

In step 205, the client selects one or more of the candidate node servers from which to obtain content. For example, the client can select the most topologically proximate candidate node server(s) that can, together, provide all of the requested content to the client. Or, for example, as described in more detail below, the client can engage in an analysis of the content delivery capabilities of the candidate- node servers (e.g., evaluate the bandwidth and/or latency characteristics between the client and each candidate node server) and select one or more of the candidate node servers for delivery of content based on the results of that analysis.

In step 206, the client contacts the selected node server(s) to request transmission of the content. The request includes an identification of the content requested as well as an indication of when the content is to be transmitted to the client. Immediate delivery of content can be requested or content can be scheduled for delivery at some time in the future.

In step 207, the selected node server(s) effect transmission of the requested content to the client. In general, after receiving a request from a client for delivery of content, a node server schedules delivery of the content, as described in more detail below, then transmits the content at the scheduled time (which may be immediately). As discussed further below, to effect delivery of content requested by a client, a node server may itself request that one or more other node servers deliver content to the client, either directly or via the requesting node server. This may be necessary or desirable, for example, if the node server no longer stores part or all of the requested content, if the node server determines that it will be unable to satisfactorily deliver part or all of the requested content at the requested time, or if the node server determines that it is preferable (e.g., quicker or otherwise more efficient) for other node server(s) to deliver part or all of the requested content.

Finally, in step 208, the client communicates with the core server regarding the success of the delivery of the requested content. For example, the client can indicate to the core server whether the content was delivered or not. The client may also communicate other information regarding the content delivery to the core server, such as the time at which the content delivery began and the time at which the content delivery ended. Additionally, the client can communicate information to the core server regarding the characteristics of the content delivery, such as the bandwidth and/or latency performance associated with the content delivery. (Alternatively, some or all of the information regarding delivery of content from a node server to the client can be communicated to the core server by the node server.) The auditing of the delivery of content to a client and from a node server is discussed in more detail below.

As indicated above, the method 200 illustrates one particular way in which the invention can be implemented. As also indicated above, those skilled in the art can readily appreciate a variety of modifications that can be made to the method 200 in accordance with the invention, i.e., while still producing the functionality of the invention as described herein. For example, steps 204 and 205 of the method 200 could be combined so that the core server itself selects node server(s) for delivery of content to a client, step 206 then being modified so that the core server contacts the node server(s) directly with instructions for delivery of content.

A variety of particular implementations can be used to achieve the functionality (as described further below) of a core server, node server or client. In general, a core server, node server or client can be embodied by any hardware that is compatible with the network of which the core server, node server or client is part, such as, for example, stationary computers (e.g., desktop computers, workstations), portable computers (e.g., laptop computers, handheld computers, personal digital assistants), portable telephones (e.g., cellular telephones) and televisions. The hardware used to implement a core server, node server or client operates in accordance with software and/or firmware that produces the functionality of the core server, node server or client. (For convenience, software and/or firmware for producing the functionality of a core server, node server or client is sometimes referred to herein as "core server software," "node server software" or "client software," respectively.) Communication between and among the core server, node servers and clients can be implemented using any technology appropriate for the type of network of which the core server, node servers and clients are part, as known by those skilled in the art. Communication between and among the core server, node servers and clients can be either wired or wireless.

As indicated above, a core server is a network site that is controlled by a core server owner that desires to distribute content to one or more other sites on the network. In general, as discussed elsewhere herein, the invention can be used by a core server owner to distribute any type of content. For example, a core server owner may be a content provider (e.g., an on-line video store) that desires to distribute audiovisual programs (e.g., movies) over a network to viewers. Or, for example, a core server owner may be an on-line retailer or other entity that desires to distribute software over a network to purchasers or renters.

When a system according to the invention is implemented on a computer network, a core server of the system can be embodied by one or more server computers (i.e., any computer or computers that operate in accordance with server software, as understood by those skilled in the art) that operate in accordance with core server software. For example, when a system according to the invention is implemented on the Internet, a core server can be embodied by server computer(s) operating in accordance with core server software that implement a Web site of a content provider (e.g., a movie distributor) and perform other functions of a core server. In such an implementation, the server computer(s) can also be used to implement multiple Web sites that, together, comprise the core server. For example, a core server can comprise one Web site that is used to manage interactions with client owners, a different Web site that is used to manage interactions with node server owners, and yet another Web site that is used to manage interactions with node servers. Further, when a core server is comprised of multiple server computers (or multiple devices of another type, for other embodiments of the invention), the server computers can be geographically remote with respect to each other.

When a system according to the invention is implemented on a television network, a core server of the system can be embodied by a headend (or comparable apparatus, as known to those skilled in the art) that operates in accordance with core server software. A core server of a system according to the invention implemented on a television network can also be embodied by apparatus operating in conjunction with a headend to accomplish the functionality of a core server. A core server of a system according to the invention implemented on a television network may even be embodied in part in a set-top box, e.g., data representing the content that a client can request. Additionally, television networks can now enable the transmission of packet data (e.g., IP packets), which can facilitate implementation of a system according to the invention.

The core server software can enable the core server to provide content to node servers for eventual distribution to clients in accordance with the invention. (It is anticipated that it will typically be desirable to transmit the content from the core server to the node servers via the network; however, other methods can be used to distribute content from the core server to node servers, such as sending a data storage medium or media on which the content is stored through the mail.) Additionally, as described in more detail below, the core server software can enable determinations of which content each node server is allowed to provide, i.e., which content is to be stored on each node server. (As explained further below, the invention can also be implemented so that node servers include node server software that assists in, or makes, such determinations.)

The core server stores data identifying the content available for transmission to clients. The core server software enables display, in response to a request from a prospective client, of information identifying the content available for transmission to a client. For example, when the invention is implemented on the Internet, conventional software and hardware, as is well known, can be used to transmit an appropriate Web page or pages from a computer at a core server network site to a computer at the client network site in response to a request received by the core server from the client for an identification of the content available for transmission to the client. Or, for example, when the invention is implemented on a television network, an identification of the available content can be transmitted from a headend to a set-top box that is associated with a television at the client network site.

The core server software accepts and responds to requests for content. Each request for content is evaluated to determine whether distribution of the content to the requesting client is approved. If the request is approved, then the core server can respond to the request by providing to the client a list of one or more candidate node server(s) from each of which some part or all of the content can be obtained. The list of candidate node servers may include multiple node servers that store all of the requested content or multiple node servers that store the same part of the requested content. (Such node servers are referred to herein as "redundant node servers.") In such case, client software operating on the client can determine from which of the redundant node servers to obtain content, as described further below. Alternatively, rather than providing a list of one or more candidate node server(s) to the client, the core server can directly transmit instructions to one or more node server(s) to effect transmission of the content to the client. In either case, the invention can be implemented so that a node server requested to deliver content can enlist one or more other node servers to assist in delivering the content, as described further below.

The core server can store a topological database including a topological map of the network (e.g., a list of network nodes and nodes adjacent to each node in the list). The core server software can enable the topological database to be constructed and updated. (Alternatively, an appropriate topological database can be obtained from another entity, though it is anticipated that this approach may generally be undesirable or infeasible because the topological database used by a particular core server will typically be unique to that core server and will typically require continual updating, as discussed in more detail below.) The content, creation and maintenance of a topological database for use with the invention are described in more detail below. As also described in more detail below, the core server software can make use of the topological database to identify one or more candidate node servers (in particular, candidate node servers that are the most topologically proximate to the client) from which requested content can be transmitted to the client requesting the content.

The core server software can audit the delivery of content by node servers and receipt (and, perhaps, use) of content by clients. A core server also stores and updates account information for clients and/or node servers, which account information can include the results of the auditing. For example, as discussed elsewhere herein, the invention can be implemented so that an owner of a network site is provided with incentive(s) to make that site a node server. In such an implementation, it is necessary to keep track of the content provided by a network site acting as a node server. Additionally, it is anticipated that the invention will typically be implemented so that a client pays for access to the content transmitted to the client. When that is the case, it is necessary to keep track of the content transmitted to the client. The auditing information can include, for example, data regarding which content was viewed by a client or distributed by a node server, when the content was viewed by a client or distributed by a node server, and the amount of the payment due from the client or incentive due to the node server. The auditing information may also include data regarding the characteristics of the content delivery, such as, for example, the bandwidth and/or latency performance associated with the content delivery or, when video content is delivered, the frame rate of the video produced from the delivered video content.

A core server can also store a master copy of the content available for distribution. This can be desirable so that the core server owner can ensure that at least one copy of all available content will always exist and/or that the core server owner retains control over at least one copy of all available content, so that the core server owner can be certain of being able to provide all available content on an ongoing basis. However, the invention need not necessarily be implemented so that the core server stores a master copy of all available content. If the amount of data storage space required to store all of the available content is deemed by the core server owner to be prohibitively large or expensive (as may be the case, in particular, when the available content is represented by visual recording data, such as video data), the core server owner may decide instead to rely on storage of the available content by the node servers to ensure that a copy of all available content is continually maintained. As the number of node servers on which particular content is stored increases, the core server owner can be increasingly confident that a copy of that content will be maintained on an ongoing basis. Even if the core server owner does not store a master copy of all available content on the core server, the core server owner may decide to store master copies of parts of the available content that are deemed particularly critical to the core server owner's operation (e.g., very popular content) or that are stored by only one or relatively few node servers.

Illustratively, in an embodiment of the invention in which a content provider distributes video programs (e.g., movies) over a network to viewers (client owners), a viewer can, for example, visit a core server site to check on the availability of a particular video program, manage the viewer's account, pay for viewing of video program(s) using an appropriate payment mechanism (e.g., credit card) or engage in any of a variety of other appropriate interactions with the core server. Node server owners can, for example, visit the core server site to work out an arrangement with the core server owner regarding which video programs or parts of video programs are to be distributed by the node server and the incentive arrangement associated with distribution of those video programs.

As indicated above, a node server is a network site that assists a core server in distributing content on behalf of the core server to one or more clients. Any network site other than one that is part of the core server can potentially perform the functions of a node server in a system according to the invention. The node servers are an "army" that the core server enlists to aid in distributing content to clients.

In a typical implementation of the invention, multiple copies of each part of the content offered by a core server owner are stored at different network sites (node servers). If enough node servers are enlisted, a system according to the invention can operate so that only network sites (node servers) that are otherwise idle need to be used for distribution of content on behalf of the core server (or so that relatively few otherwise occupied sites need to be used). In any event, the invention takes advantage of computational, bandwidth and data storage capacity available on the network that would otherwise go unused. Alleviating bandwidth constraints is, in particular, an advantageous aspect of the invention, especially when the invention is implemented on a computer network such as the Internet.

It is anticipated that in many applications of the invention, the node server owners will be individuals or households. For example, when a system according to the invention is implemented on the Internet, node servers can be personal computers with access to the Internet that are located in the homes of individuals or families (the node server owners). Or, for example, when a system according to the invention is implemented on a television network, node servers can be television set-top boxes that are located in the homes of individuals or families. Traditionally, such devices have operated strictly in a client capacity. An important aspect of the invention is that the traditional role of such devices can be changed (i.e., the devices can be operated as servers, rather than as clients) so that unused capacity (processing, data communications, data storage) of those devices can be used to facilitate distribution of content over a network.

In one advantageous implementation of the invention, the node servers are network sites whose owners (e.g., individuals or families) have chosen to provide a portion of their site's computational, bandwidth and data storage capacity for use in distributing content in return for an incentive. However, while this is anticipated to be a particularly desirable way of implementing the invention, in other implementations of the invention it may not be necessary to provide an incentive to the node server owners. For example, the invention can be implemented on a television network so that set-top boxes are enlisted as node servers for distribution of content over the network; rather than offering an incentive to the node server owners, the set-top boxes can simply be constructed and/or operated to provide the functionality of a node server.

Typically, the node servers are not affiliated with the core server (except by an agreement between the node server and core server for the node server to distribute content on behalf of the core server in accordance with the invention). In many implementations of the invention, participation by node servers is voluntary. Consequently, there may be an insufficient number of voluntary node servers to enable a system according to the invention to operate as well as desired (particularly when such a system first begins operating). Therefore, the core server owner may itself operate one or more node servers. The invention contemplates that at any time one or more node servers can be operated by the core server owner. However, it is anticipated that, in general, most of the node servers will be operated by node server owners other than the core server owner, and that in situations in which a core server owner finds it necessary or desirable to initially operate a number of node servers, the core server owner will gradually phase out operation of such node servers as a critical mass of volunteer node servers is approached and reached.

A variety of particular implementations can be used to achieve the functionality of a node server as described further below. The particular implementation used can depend on the type of network with which the invention is used. For example, when the invention is implemented on a computer network, a node server of a system according to the invention can be embodied by a personal computer that operates in accordance with node server software that performs the functions of a node server in accordance with the invention, as described below. Or, for example, when the invention is implemented on a television network, a node server of a system according to the invention can be embodied by a television set-top box including adequate and appropriate processing and data storage capacity and capability that operates in accordance with node server software. Further, particularly as technological advances increase the capabilities of such devices, portable devices such as laptop computers, handheld computers, personal digital assistants (PDAs) and cellular telephones may also operate as node servers.

By contacting a core server owner, other network site owners can sign up to make their sites part of a node server army, and obtain, if necessary, node server software for effecting operation of the device(s) at their site as a node server. It is anticipated that the invention will often be implemented so that signing up to be a node server and obtaining appropriate node server software are transactions that are conducted via the network. (However, other distribution methods can be used.) For example, when the invention is implemented on the Internet, a conventional Web browser can be used to enable a prospective node server to access a Web site maintained on the core server to request to participate in distribution of content on behalf of the core server owner and download node server software. It is desirable that node server software be implemented to run on a device in the background so that the node server software does not unduly disrupt other operation of the device.

The node server software can enable a node server to acquire content from a core server. (As indicated above, it is anticipated that it will typically be desirable to transmit the content from the core server to the node servers via the network; however, other distribution methods can be used.) When the invention is implemented on the Internet, for example, this aspect of the node server software can be embodied by a conventional Web browser that enables the node server to access a Web site maintained on the core server to download content that it has been agreed that the node server will store for possible distribution to clients. As indicated above and discussed further below, the node server software can also be implemented to enable a determination regarding which content the node server will provide, i.e., which content is to be acquired from the core server and stored on the node server.

The node server software accepts and responds to requests for transmission of content. Depending upon the manner in which the invention is implemented and upon the manner in which content is distributed among node servers (and, perhaps, in some situations, the core server), such requests can come from the core server, another node server or a client. In general, the node server's response to a request for content is to take appropriate action, as discussed further below, to effect delivery of the requested content either to the client, or to a node server or core server (for eventual delivery to the client).

Upon receipt of a request for transmission of content, the node server software determines whether all of the requested content is stored by the node server. If not, then the node server software determines at which network site(s) the missing content is stored so that the node server can communicate with other network site(s) as necessary to effect delivery of the requested content. Usually, content that a node server seeks to obtain to fulfill a request for transmission of content is stored on another node server or servers. In some situations, content may also be provided by the core server; however, in accordance with the invention, content is usually primarily or entirely provided by node servers, and the invention is generally described herein as embodied in that manner. A node server can determine at which network site(s) particular content is stored by, for example, reviewing information provided to the node server by the core server regarding storage of content by other node servers. A node server can also obtain this information, for example, by communicating with other node servers (the identity of which can be provided to the node server by the core server) to ask what content is stored on those node servers.

Even if a node server stores all of the requested content itself, a node server may still determine whether part or all of requested content is stored on other node server(s) and enlist other node server(s) in delivering content. This may be done, for example, if a node server determines (using one or more of the techniques described below for evaluating content delivery capability) that it cannot, or may not be able to, ensure that part or all of the requested content is delivered on time, or if a node server determines that other node server(s) can more effectively deliver part of the requested content at the specified time.

Once the node server software has identified where all of the requested content is stored (multiple sources of some part or all of the content can be identified), the node server software can evaluate the capability of the node server (and other node servers, if appropriate) to deliver the content at the time requested. (Content can be requested for immediate delivery or delivery at some time in the future.) Such an evaluation can be performed using the same techniques that can be used by a client to evaluate the ability of candidate node server(s) to deliver desired content; examples of such techniques are described in more detail below. The capabilit(ies) of the node server(s) to deliver content at the time requested (in particular, the degree(s) of certainty with which the node server(s) can be expected to deliver content at the time requested) can be evaluated together to arrive at a determination as to which content will be delivered from which node server.

Once the node server software has determined from which node server(s) content is to be delivered (it is anticipated that, often, the node server that received the content request will itself deliver all of the requested content), the content is scheduled for delivery by the selected node server(s) to ensure that the content is delivered by the time requested and, when the scheduled time arrives, the node server(s) transmit the content (directly or indirectly) to the client. If multiple node servers are delivering content, the node server which received the request for content can manage the download and assembly of each of the required pieces of the content. If possible, it is desirable for a node server to schedule content delivery for a system according to the invention so as not to conflict with other usage of the node server. The invention can advantageously be implemented so that a node server tries to be as productive as possible (i.e., deliver as much content as possible) in order to earn the maximum incentive for the node server owner.

The invention can also be implemented so that a node server performs, in whole or in part, one or more functions of a core server (as described above). For example, a node server can determine which content the node server will store for possible delivery to clients. A node server can also store data identifying content that is available for transmission to clients and display an identification of the available content to a client. A node server can also store a topological database which can be used, for example, to enable a node server to select other node server(s) to aid in delivering requested content. (Alternatively, a node server can access a topological database stored at another network site, e.g., at the core server.) A node server may also collect auditing information regarding content delivery.

Illustratively, in an embodiment of the invention in which a content provider distributes video programs (e.g., movies) over a network to viewers, node server software can be used to turn a network site into a video server (node server). Depending on the amount of hard-disk data storage allocated to the task, such a node server may hold, for example, a full 2 gigabyte movie file, a 100 megabyte movie preview, or several 10 megabyte chunks of different movies.

As indicated above, a client is a network site that is controlled by a client owner that desires to obtain content distributed by the core server owner. Like node server owners, it is anticipated that in many applications of the invention, the client owners will be individuals or households. For example, the clients may be personal computers with access to the Internet that are located in the homes of individuals or families (the client owners). Similarly, the clients may be television set-top boxes that are located in the homes of individuals or families.

A variety of particular implementations can be used to achieve the functionality of the client as described further below. The particular implementation used can depend on the type of network with which the invention is used. For example, when the invention is implemented on a computer network, a client of a system according to the invention can be embodied by a personal computer that operates in accordance with client software that performs the functions of a client in accordance with the invention, as described below. Or, for example, when the invention is implemented on a television network, a client of a system according to the invention can be embodied by a television set-top box including appropriate processing capability that operates in accordance with client software. Portable devices such as laptop computers, handheld computers, personal digital assistants (PDAs) and cellular telephones may also operate as clients.

The client contacts the core server to determine what content is available for transmission to the client and displays information identifying the available content, then communicates with the core server to request transmission of specified content at a specified time. For example, when the invention is implemented on the Internet, these functions can be accomplished using a conventional Web browser that enables a prospective client to access a Web site maintained on the core server. The core server can be implemented to enable the client to communicate with the core server prior to requesting particular content to learn about characteristics of that content and/or possible node servers from which that content can be obtained, so that the client owner can make a preliminary assessment regarding whether it is feasible or desirable to obtain the content. If the client has not previously obtained content from the core server, the client may also need to obtain client software. It is anticipated that it will typically be desirable to transmit the client software from the core server to a client via the network; however, other distribution methods can be used. The client software can be implemented to operate within or outside of a Web browser or other software used by the client to access the core server.

As discussed above, the invention can be implemented so that, in response to a request for content from a client, a core server provides to the client a list of one or more candidate node server(s) from each of which some part or all of the content can be obtained. If necessary (e.g., if the candidate node servers include redundant node servers), the client software determines from which of multiple candidate node servers to obtain content.

As part of such determination, the client software can be implemented to evaluate the capabilities of the candidate node servers to deliver content. For example, the client software can determine the topological proximity of the candidate node servers to the client (using techniques described elsewhere herein), it being generally desirable to download content from topologically proximate node server(s). The client software can also be implemented to evaluate, for example, the bandwidth and/or latency performance of the candidate node servers (using techniques described elsewhere herein), it being generally desirable to download content from node server(s) having good bandwidth and/or latency characteristics. The client software can also consider other factors, such as, for example, other scheduled content delivery by a candidate node server and/or an analysis of a candidate node server's operation (e.g., trend analysis). The client software can be implemented to select node server(s) for delivery of content based on one or a combination (e.g., topological proximity and bandwidth performance) of the above considerations.

The capabilities of the candidate node servers to deliver content at the time requested (in particular, the degrees of certainty with which the candidate node servers can be expected to deliver content at the time requested) can be evaluated together to arrive at a determination as to which content will be delivered from which node server. For example, the client software can favor selection of those candidate node server(s) that are determined to be most topologically proximate to the client in accordance with a particular criterion or criteria. Or, for example, the client software can favor selection of those candidate node server(s) having the best bandwidth performance characteristics. Or, for example, the client software can favor selection of those candidate node server(s) that are not scheduled to deliver other content at the same time.

Once the client software has selected node server(s) for delivery of the requested content, the client communicates with the selected node server(s) to schedule and download the content. The client software can be implemented so that, if the entire content is not available at one time from a single node server (as it is anticipated will often be the case), the client software can manage the download and assembly of each of the required pieces of the content at multiple different times and/or from multiple node servers. Thus, the client software can advantageously be implemented to leverage the bandwidth of any local node servers to make the viewing of the content problem-free (i.e. low latency, no dropouts, etc.). Alternatively, the client can communicate with a single node server which manages the acquisition and assembly of the pieces of content, then delivers the entire set of content to the client.

The client software may also include one or more computer programs that enable use (e.g., observation) of the content (e.g., movie) obtained by the client. Alternatively, the content can be used (e.g., observed) by making use of other computer programs (e.g., when the invention is implemented on a computer network, movie viewer software), preferably those which are widely available.

The client software can also audit the delivery of content to a client. Most basically, the client software can record which content was delivered, when and by which node server. The client software may also record other information, as discussed in more detail below, such as the bandwidth and latency performance in delivering the content. The client software can also be implemented to audit the use (e.g., display) of delivered content.

Above, the general operation of a system according to the invention and the general functionality of the components (core server, node server, client) of a system according to the invention have been described. Below, particular aspects of the invention are described in more detail.

The invention can be implemented so that the core server software, node server software, or both include software for determining which content each node server stores for possible delivery to clients. In general, it is desirable that such software operate on the core server, since one central entity is typically in the best position to make decisions regarding dispersion of stored content over the network. However, it may be desirable to implement the invention so that such software is also executed on node servers that have indicated a desire to participate in distribution of content on behalf of the core server, so that a node server, in deciding which content the node server will agree to distribute, can identify which content is relatively scarce in the node server's local region of the network topology.

For example, software for determining which content each node server stores can be implemented to seek to ensure that duplicate copies of particular content are stored on node servers that are topologically dispersed throughout the network. This can be accomplished, for example, using an annealing method, as understood by those skilled in the art. The bandwidth and/or latency characteristics of a node server can also be incorporated into the decision regarding which content is to be stored by each node server. For example, it can be desirable to store frequently requested content or very data-intensive content at node servers that have a high-bandwidth connection to the network.

Additionally, the core server software, the node server software, or both can include software that analyzes the frequency of delivery of one or more sets of content or parts of a set of content by one or more node servers, and makes changes to the content stored by one or more node servers and/or allows new content storage by one or more node servers in accordance with the results of such analysis. For example, if particular content has been requested with less than a threshold frequency from a particular node server, then a decision can be made to no longer store that content at that node server. Similarly, if particular content has been requested with greater than a threshold frequency from a particular node server, then a decision can be made to store additional copies of that content at one or more node servers that are topologically proximate to that particular node server.

As indicated above, a topological database can be created, maintained and stored for use in implementing the invention. In a typical implementation of the invention, a core server creates, maintains and stores a topological database for use by that core server. The invention can be implemented so that a node server or client can also create, maintain and/or store a topological database. However, it is anticipated that the invention will more usually be implemented so that, if a node server or client needs to make use of data stored in a topological database, the node server or client accesses the topological database maintained by the core server.

The topological database includes a topological map. For example, when the invention is implemented on the Internet, the topological database includes data representing IP (Internet Protocol) address chains between nodes of the network. Such chains can be represented in the topological database by a list of nodes and adjacent nodes, and/or by a list of paths connecting nodes. (If, as is often the case, leaf nodes of the network are connected only to a single other node of the network, data representing the leaf nodes can be discarded from the data representing the topological map in order to reduce the amount of data storage capacity required for the topological database.) It is anticipated that the topological map will typically represent only a portion of the network of which the core server, node servers and clients are part. For example, it is anticipated that many networks with which the invention will be implemented will include a prohibitively large number of nodes, so that it is desirable for the topological map to only include nodes that have expressed a desire to be clients or node servers (or that it is anticipated may want to be clients or node servers), as well as nodes along topological paths between such nodes.

The topological database can also include other information concerning the connection between nodes of the network. For example, the topological database can include data regarding bandwidth capacity and/or latency between nodes. The bandwidth capacity and/or latency data can include data regarding expected bandwidth and latency performance, and/or data regarding past bandwidth and latency performance (e.g., measured bandwidth and/or latency and the time at which the measured performance occurred). Bandwidth and latency data can be specified separately for each of the two directions of communication between nodes. The topological database can also include identification of nodes to or from which communication is disallowed entirely. The topological database can also include information regarding past problems with connections between nodes, such as, for example, time periods during which communication could not take place or took place at unacceptably low bandwidth rates or unacceptably high latencies.

The data in a topological database can be used for a variety of purposes in a system according to the invention. For example, the information in the topological database can be used by a core server and/or node server(s) in determining which content is stored by particular node server(s). The information in the topological database can also be used by a core server in identifying candidate node servers for possible transmission of requested content to a client. The information in the topological database can also be used by a client to determine from which redundant node server to obtain particular content.

In general, the topological map can be created and maintained (e.g., updated) in any appropriate manner. Software known to those skilled in the art can enable the creation and/or update of a topological map of a network. For example, when the invention is implemented on a computer network such as the Internet, each time that a network site (e.g., a client or node server, or a potential client or node server) contacts the core server, the Windows program TraceRoute (or software accomplishing the same or similar functionality) can be used to identify all nodes in the topological path between the contacting node and the core server node. (It is, in particular, desirable to identify topological paths from network sites that have not previously contacted the core server; however, it can also be desirable to identify topological paths from network sites that have previously contacted the core server, since such a network site may communicate with the core server along a topological path that is different from the topological path along which previous communication(s) occurred, because the old topological path no longer exists, because of changes in network routing protocols, or because of any other reason.) Data representing the nodes in the topological path between the contacting node and the core server is stored in the topological database. (The data may result in revision to existing data in the topological database.) In addition to identifying a topological path each time that a network site contacts the core server, the core server may find it necessary or desirable to take affirmative action to further develop the topological map by sending an echo request packet ("pinging") to other nodes on the network to determine the topological path between such nodes and the core server node based on the echo response packets that such nodes send back. Additionally, the core server can on an ongoing basis delete parts of the topological map, e.g., parts of the topological map that are determined to be incorrect, obsolete or unimportant to operation of a system according to the invention. This can be done, for example, by deleting parts of the topological map that have not been updated (assuming that the topological map is "updated" even when the topological path from a contacting node is already present in the topological map) within a specified duration of time prior to the current time.

In a network on which the invention is implemented, there may be multiple core servers that make use of the invention to distribute content. It is anticipated that each core server will preferably construct their own topological database, since the cost to create and maintain a topological database is not high, since each core server will typically make use of a topological map that is different from that used by other core servers, and since a topological database will typically need to be updated on an ongoing basis (the topology of a network such as the Internet, for example, is continually changing).

As indicated above, a core server can respond to a request for content from a client by providing to the client a list of one or more candidate node server(s) from each of which some part or all of the requested content can be obtained. As discussed above, it is desirable to identify candidate node servers that are topologically proximate to the client. In general, a method for identifying topologically proximate node servers can make use of whatever information has been accumulated in the topological database (or similar information that can be obtained, e.g., topological paths obtained using a program such as TraceRoute). Once one or more node servers have been identified as sufficiently topologically proximate to the client in accordance with a specified criterion or criteria, the identity of those node server(s) (the candidate node server(s)) is then communicated to the client. (The invention can also be implemented so that the identity of candidate node server(s) is communicated to a node server so that that node server can select appropriate node servers for transmission of the requested content to the client.)

For example, the identification of topologically proximate node servers can be accomplished by performing a breadth-first search, as is known to those skilled in the art. A breadth-first search begins with the client node and successively moves out from the client node one "node radius" at a time (i.e., the first node radius includes all nodes that are topologically adjacent to the client node, the second node radius includes all nodes that are topologically adjacent to those nodes, etc.). At each node radius, the topological proximity to the client node of each node in the node radius is determined in accordance with a specified criterion or criteria and the nodes are ranked in order of topological proximity. (The topological proximity of a node can change as the breadth-first search moves progressively through the node radii.) The determination of topological proximity of a node can take into account characteristics of a topological path to the node, such as the bandwidth and/or latency between nodes in the path. In particular, it is desirable to emphasize the bandwidth characteristics of a topological path in determining the topological proximity of a node. It may also be desirable to take into account the time of day that the requested content will be transmitted when evaluating the bandwidth and/or latency characteristics of a topological path (and thus the topological proximity of a node). For example, available bandwidth along any particular path will typically vary throughout a day (e.g., available bandwidth may be relatively decreased during business hours). To increase the efficiency of the breadth-first search, the breadth-first search can, but need not necessarily, be implemented so that paths to nodes with a relatively high topological proximity (e.g., node paths that produce greater than a threshold topological proximity, or a specified percentage of node paths producing the highest topological proximity at each node radius) are considered first. (Other node paths can be considered later if deemed desirable.) The breadth-first search can be stopped when a predetermined number of node servers has been identified for which a topological path to the client is determined to make the node server sufficiently topologically proximate to the client in accordance with a specified criterion or criteria.

Techniques in addition to, or instead of, a breadth-first search to identify candidate node servers. For example, TraceRoute can be used to identify the nodes in the topological paths from a core server to a client and from a core server to node servers storing requested content. If a path to a node server includes a node that is also in the path to the client, it may be concluded that the node server is topologically proximate to the client. In general, the closer that the shared node is to the client and/or node server, the more likely that the node server is topologically proximate to the client.

As indicated above, the invention can be implemented so that the core server communicates the identity of one or more candidate node servers to the client, the client software being implemented to then select one or more of the candidate node servers from which to obtain content. In one embodiment of the invention, the client software selects the most topologically proximate node server(s), as determined by the core server, that can provide the entire set of content to the client. However, in other embodiments of the invention, the client software can be implemented to perform an evaluation of the candidate node server(s) itself and select one or more node servers to provide the content based on that evaluation. (The same types of evaluation can be performed by node server software to determine which, if any, other node servers should be enlisted to assist in delivering content that has been requested from a node server.)

For example, the client software can be implemented to test the bandwidth and/or latency characteristics between the client and each candidate node server by sending a test packet of data to each candidate node server and measuring the bandwidth and/or latency performance, using techniques known to those skilled in the art, associated with the transmission of that data to the node servers. (Typically, bandwidth performance is of most importance and is given most weight in evaluating the ability of a node server to deliver content to the client.) To ensure the fidelity of the test of the bandwidth and/or latency characteristics, it may be necessary or desirable to send a test packet of data of a particular size. For example, since the invention will typically be used to distribute high-bandwidth content, it may be necessary for the test packet to include greater than a specified amount of data in order for the results of the test to reflect with adequate accuracy the bandwidth and latency performance to be expected when transferring the requested content. It may also be necessary or desirable to take into account the time of day that the test packet is being sent as compared to the time of day that the requested content will actually be sent. For example, available bandwidth along any particular node path will typically vary throughout a day (e.g., available bandwidth may be relatively decreased during business hours).

Additionally, a node server's operation can be analyzed (e.g., trend analysis) and that analysis used in assessing the node server's capability of delivering content. For example, trends in a node server's operating characteristics (e.g., uptime, usage, bandwidth availability) can be analyzed to form an accurate picture of the node server's past utility and operation that can be used to assess the ability of the node server to deliver requested content at a specified time. (This information can also be communicated to the core server and stored in the topological database along with other data regarding the node server.)

An evaluation of a node server's ability to deliver content can also be made, in whole or in part, by determining the topological proximity of the node server to the content delivery destination (which can be the client that requested the content or another node server that acts as an intermediary in delivering content to the client). The methods described above for identifying the topological proximity of a candidate node server to a client can be used for this purpose. (It is desirable for the client software or node server software to be implemented so that any information obtained regarding topological paths—using, for example, TraceRoute or some other mechanism—as part of determining the topological proximity of a node server is transmitted to the core server for inclusion in the topological database.)

Constraints imposed by other content delivery obligations are also preferably taken into consideration in evaluating a node server's ability to deliver requested content at a specified time. If, for example, a node server has already accepted one or more requests to deliver content that will, or may, necessitate content delivery at least in part at the same time that content associated with the instant request must, or may need to, be delivered, an evaluation can be made of whether, in view of the expected requirements (e.g., bandwidth) associated with delivery of all of the requested content, available bandwidth from the node server to the content delivery destination (which can be the client that requested the content or another node server that acts as an intermediary in delivering content to the client) may be exceeded to such an extent that the node server cannot (or cannot with a required degree of certainty) deliver the content associated with the current request at the time required (or no later than a specified time after the requested time).

The invention can also be implemented so that, if the client software evaluates the candidate node servers and finds that there are not enough candidate node servers that can be expected to satisfactorily deliver content so that the entire set of requested content can be transmitted to the client at the specified time, the client contacts the core server to request that additional candidate node servers be identified and the identity of those candidate node servers transmitted to the client. The content delivery capabilities of the additional candidate node servers are then evaluated by the client. It is desirable to implement the client software so that at some point (e.g., after evaluating a specified number of candidate servers), if the client continues to be unable to identify enough satisfactory candidate node servers, the client software relaxes the criterion or criteria used to evaluate whether a candidate node server is satisfactory.

As discussed above, the invention can be implemented so that, if necessary, a node server from which transmission of content has been requested (a "primary node server") can enlist one or more other node servers ("secondary node server(s)") to assist in transmitting the content to the client. This can be done by having the secondary node server(s) transmit content to the primary node server (which, in turn, transmits the content to the client) or by having the secondary node servers transmit the content directly to the client. (In some implementations of the invention, the content may also be transmitted to another node server—perhaps for combination with other content at that node server—prior to being transmitted to the client or primary node server.) The description above regarding selection of node servers by a client also applies to the selection of secondary node servers by a primary node server. For example, when the potential secondary node servers include redundant node servers (i.e., multiple node servers that each store all of the requested content or a same part of the requested content), the node server software of the primary node server can evaluate the topological proximity of the redundant node servers to the content delivery destination (which can be the client, the primary node server and/or another node server) and select redundant node server(s) to be secondary node server(s) based on the topological proximity of the redundant node servers to the content delivery destination.

As the number of node servers distributing particular content increases, the importance of the selection of particular node server(s) to distribute that content may decrease, since there is likely to be a large number of relatively topologically proximate node servers that can effectively distribute the content to a particular content delivery destination. Additionally, as the number of node servers distributing particular content increases, the likelihood of finding a node server that will effectively distribute the content to a particular content delivery destination increases. For example, when the invention is implemented on a television network, a system according to the invention may be implemented so that all or most of the set-top boxes in a local area (e.g., a neighborhood) operate as a node server. In such an implementation, finding a node server to effectively distribute the most commonly requested content may be trivial (the most desirable node server to distribute particular content will often be only one node radius away in the network topology). Additionally, in such an implementation, it may not be necessary for a core server to provide an identification of candidate node servers to clients; an identification of the node servers to use in obtaining the most commonly requested content may be stored on an ongoing basis on each set-top box.

Once the client software has selected node server(s) to provide the requested content, the client software schedules delivery of the content from the node server(s). The content delivery schedule is established based on input from the client owner regarding when use of the content is desired, which is typically specified at the same time that the content is requested.

The indication of when the content is to be transmitted to the client can be done in any appropriate manner. For example, the client may request that the content be transmitted immediately. Or, the client may request that the content be transmitted beginning at a specified time in the future. Or, the client may request that the content be transmitted so that all of the content has been transmitted to the client no later than a specified time in the future. Further, the indication of when to transmit the content can be specified as a hard constraint that is not to be violated (e.g., "The content must be transmitted so that all of the content arrives at the client no later than 7:00 P.M. tonight") or as a soft constraint that indicates some degree of tolerance of failure to transmit the content at the requested time (e.g., "Transmit the content so that there is about a 90% chance that all of the content arrives at the client no later than 7:00 P.M. tonight"). (Failure to transmit content to a client at a requested time can be handled in accordance with any of a variety of typical commercial practices, e.g., the client owner's payment for the content can be refunded.)

If the client has requested that the content be immediately delivered, then at least part of the "schedule" will be a request to a node server for immediate delivery of at least a first part of the content. Otherwise, a request is sent to each node server from which content is to be delivered to schedule delivery of the content from that node server so that the content arrives at the client before a specified time. For example, when parts of a set of content are delivered from different node servers (e.g., sequential segments of a video program), it may be necessary or desirable to schedule the delivery of each part of the content to begin at different times (e.g., the delivery of each successive segment of a video program begins at some time later than the delivery of the immediately previous segment). In general, it is desirable for the delivery of content from a node server to be scheduled so that allowance is made for possible subpar bandwidth performance in transmission of the content from the node server, i.e., it is desirable to schedule the content "earlier" than should be necessary. This can be particularly important where parts of a set of content are delivered from different node servers (e.g., sequential segments of a video program).

As discussed above, the invention can be implemented so that a primary node server can enlist other secondary node servers to assist in transmitting content to a client. The above description regarding scheduling of delivery of content by a client also generally applies to the scheduling of delivery of content by a primary node server. The invention can be implemented so that scheduling requests received by a node server from a client are, when conflicts arise, given higher priority than scheduling requests received by a node server from another node server. This may be desirable, for example, since requests from a client will always be for content that has been requested, while requests from a node server may be for content that has not yet been requested (and are therefore lower priority), but which the node server anticipates may be requested in the future.

The invention will typically be implemented so that the core server can audit the delivery of content to a client and from a node server. (This will be necessary, for example, to enable the core server to obtain payment for use of content by client owners and for the core server to provide incentives to node server owners.) The invention can be implemented to enable a client and/or a node server to communicate auditing data to the core server regarding delivery of particular content. The auditing data can include identification of the content delivered, the node server(s) from which content was delivered, and the client to which the content was delivered. The auditing data can also include information regarding the characteristics of the content delivery, such as when the content was delivered, the bandwidth and/or latency performance associated with the content delivery, and identification of any transmission problems during the content delivery. The auditing data can also include information regarding the compensation due from the client for use of the content and the incentive(s) due to the node server(s) for delivering the content.

As discussed above, the owner of a network site can be provided with one or more incentives to induce the network site owner to allow their site to be used as a node server. Any incentive or combination of incentives (examples of which are discussed above) can be used. The invention can be implemented so that incentive(s) are given to a node server owner only if the core server owner receives compensation from the client owner.

The incentive(s) can be made variable, dependent on any of a variety of factors specified by the core server. This can be beneficial to induce network sites of highest value to the core server to operate as node servers. For example, the incentive(s) can be made dependent on the bandwidth and/or latency performance of the node server (in general and/or during particular content delivery). As the bandwidth of the node server increases and/or the latency decreases, the incentive(s) can be increased, reflecting the increased value to the core server of content delivery by the node server. The measurement of change in the bandwidth and/or latency can be absolute and/or relative to the bandwidth and/or latency of other node server(s) (in particular, node server(s) that deliver the same content). As another example, the incentive(s) for delivery of particular content can be made dependent on the number and/or topological proximity of other node servers that can provide the same content. As the number of other such node servers decreases and/or the topological proximity of one or more other such node servers to the client (or other node server to which the content is to be delivered) decreases, the incentive(s) can be increased, reflecting the increased value to the core server of delivery of that content by the node server. As yet another example, the incentive(s) can be made dependent on the time of day at which content is delivered. The incentive(s) can be increased for delivery of content during peak demand hours (e.g., 8:00 P.M. to 11:00 P.M.) and diminished for delivery of content during off-peak hours (e.g., during the middle of the night). As still another example, the incentive(s) can be made dependent on the amount of content stored by a node server. As the amount of content stored by a node server increases, the incentive(s) increase, reflecting the node server's increased value to the core server. Further, the incentive(s) offered to a node server may change over time, as the circumstances related to the distribution of content by the node server change. For example, at the beginning of operation of a system according to the invention in which a core server owner offers incentive(s) for distribution of content on behalf of the core server owner, the core server owner may offer relatively generous incentive(s) in order to induce network site owners to agree to allow their network sites to be used as node servers. Over time, as more and more network sites agree to participate in the system according to the invention and the participation by any particular network site becomes less valuable, the core server owner may reduce the incentive(s) given to network site owners to induce them to use their sites as node servers.

Below, some examples of the types of communication (messages) that can occur between and/or among core server(s), node server(s) and client(s), during a method according to the invention (such as the method 200) are given to illustrate the roles of the core server(s), node server(s) and client(s) in a system according to the invention. Each example indicates the direction of the communication, the content of the communication and the response to the communication.

| | | |
|---|---|---|
| 1. | Direction: | Client asks core server |
| | Message: | What content (e.g., movies) is available? |
| | Response: | Identification of available content (e.g., list of movies and/or ID's). May list prices too. |
| 2. | Direction: | Client directs core server |
| | Message: | This is the path I use to communicate with you. |
| | Response: | If yes, topology database updated. Also, return path is added to topology database if different. |
| 3. | Direction: | Client asks core server |
| | Message: | Which node servers are proximate with specified content? |
| | Response: | List of node servers with that content from breadth-first search of the topology database. |
| 4. | Direction: | Client directs core server |
| | Message: | My paths to those node servers are as follows: [list of path(s)] |
| | Response: | OK, topology database updated. |
| 5. | Direction: | Client asks node server |
| | Message: | What is your bandwidth to me for a specified time period? |
| | Response: | Best estimate or can also do a quick test. |
| 6. | Direction: | Node server asks client |
| | Message: | Inform me when you have received this chunk of test data. |
| | Response: | Delay time from first to last byte. |
| 7. | Direction: | Client asks node server |
| | Message: | Please schedule me for delivery of specified content at specified time. |
| | Response: | Added to internal schedule table. |
| 8. | Direction: | Client asks node server |
| | Message: | Please give me specified content now. |
| | Response: | Provides the content. |
| 9. | Direction: | Node server asks another node server |
| | Message: | Please schedule me for delivery of specified content at specified time. |
| | Response: | Added to internal schedule table. |
| 10. | Direction: | Node server asks another node server |
| | Message: | Please give me specified content now. |
| | Response: | Provides the content. |
| 11. | Direction: | Client directs core server |
| | Message: | Give credit to specified node server for content successfully delivered. |
| | Response: | Database updated. |
| 12. | Direction: | Client directs core server |
| | Message: | Charge client for content delivered. |
| | Response: | Database updated. |
| 13. | Direction: | Node server asks core server |
| | Message: | What content should I be carrying given my availability profile and data storage capacity? |
| | Response: | Content description. |
| 14. | Direction: | Node server asks core server |
| | Message: | Which node servers are proximate with that content? |
| | Response: | List of node servers with the content from breadth-first search of the topology database. |
| 15. | Direction: | Node server directs core server |
| | Message: | My paths to those node servers are as follows |
| | Response: | Topological database updated. |

In the above examples, message 1 represents the first step in operation of a system according to the invention (e.g., step 201 in the method 200 of FIG. 2): a client's communication with a core server to find out what content is available for transmission to the client. Messages 2 and 4 are communications between a client and core server that are used to help build the topological map. Message 3 is a communication between a client and core server regarding the identity of candidate node servers. Message 5 is a communication between a client and node server that is used to obtain information regarding the bandwidth capacity between the client and node server prior to delivery of requested content from the node server to the client; such information can be used by the client to determine, for example, from which redundant node server to obtain content. Message 6 represents a test of the bandwidth capacity between a client and node server that can provide the information requested by the client in message 5. Messages 7 and 8 are communications between a client and node server regarding the scheduling of content to be provided by the node server to the client. Similarly, messages 9 and 10 are communications between node servers regarding the scheduling of content to be provided by one node server (e.g., a secondary node server) to another (e.g., a primary node server). Messages 11 and 12 are communications concerning the auditing of the display of content: message 11 provides information regarding a node server that delivered content (so, for instance, the node server can be properly credited with appropriate incentive(s) for delivering the content), while message 12 provides information regarding the client to which the content was delivered (so, for instance, the client can be charged an appropriate amount for obtaining the content). Messages 13 and 14 are communications between a node server and core server that enable a determination of which content is to be stored by the node server. Message 15 is a communication between a node server and core server that is used to help build the topological map.

Various embodiments of the invention have been described. The descriptions are intended to be illustrative, not limitative. Thus, it will be apparent to one skilled in the art that certain modifications may be made to the invention as described herein without departing from the scope of the claims set out below.

The invention claim is:

1. Apparatus for effecting the provision of content over a network, comprising a core server, the core server comprising:

means for receiving a request from a client for specified content;

means for communicating to the client the identity of a node server having the specified content stored thereon, thereby enabling the client to request transmission of the specified content from the node server; and means for ascertaining that the node server transmitted the specified content to the client, wherein an owner of the node server is offered an incentive as compensation for transmission of the specified content to the client.

2. Apparatus as in claim 1, wherein the incentive varies in accordance with the bandwidth and/or latency performance of the node server in transmitting the specified content to the client.

3. Apparatus as in claim 2, wherein the incentive varies in accordance with the bandwidth and/or latency performance of the node server relative to the bandwidth and/or latency characteristics of one or more other node servers that can provide the specified content to the client.

4. Apparatus as in claim 1, wherein the incentive varies in accordance with the number and/or topological proximity of one or more other node servers that can provide the specified content to the client.

5. Apparatus as in claim 1, wherein the incentive varies in accordance with the time of day at which the node server transmits the specified content to the client.

6. Apparatus as in claim 1, wherein the means for ascertaining that the node server transmitted the specified content to the client further comprises means for obtaining information regarding the characteristics of the transmission of the content.

7. Apparatus as in claim 6, wherein the means for obtaining information regarding the characteristics of the transmission of the content further comprises means for obtaining information regarding when the content was delivered.

8. Apparatus in claim 6, wherein the means for obtaining information regarding the characteristics of the transmission of the content further comprises means for obtaining information regarding the bandwidth and/or latency performance associated with the transmission of the content.

9. Apparatus as in claim 1, the core server further comprising:
    means for identifying a plurality of node servers within the network that have at least part of the specified content stored thereon;
    means for selecting from the plurality of node servers one or more candidate node servers; and
    means for communicating the identity of the candidate node servers to the client to enable the client to request transmission of the specified content via the network from one or more of the candidate node servers.

10. Apparatus as in claim 9, the core server further comprising:
    means for determining the location of the client within the network;
    means for identifying the locations of the plurality of node servers that have at least part of the requested content stored thereon; and
    wherein the means for selecting one or more candidate node servers further comprises means for selecting from the plurality of node servers one or more candidate node servers that are determined to be topologically proximate to the client.

11. Apparatus as in claim 10, wherein the determination of topological proximity to the client is performed using a breadth-first search to identify node servers that satisfy a criterion regarding topological proximity to the client.

12. Apparatus as in claim 1, the core server further comprising:
    means for identifying a network site that will act as a node server for distribution of the specified content; and
    means for providing the specified content to the node server.

13. Apparatus as in claim 12, wherein the means for identifying a network site that will act as a node server for distribution of the specified content further comprises:
    means for identifying the location of a prospective node server that desires to act as a node server for distribution of the specified content;
    means for identifying the location of one or more other existing node servers that can act as a node server for distribution of the specified content; and
    means for determining the topological proximity of the prospective node server to the existing node servers, wherein the prospective node server is selected as a node server for distribution of the specified content if the prospective node server satisfies a criterion regarding topological proximity to the existing node servers.

14. Apparatus as in claim 13, wherein the means for determining the topological proximity of the prospective node server to the existing node servers is performed using an annealing method.

15. Apparatus as in claim 1, the core server further comprising;
    means for storing data identifying available content that can be obtained by a client; and
    means for providing an identification of available content to the client.

16. Apparatus as in claim 1, the core server further comprising means for storing data identifying the location of the node server.

17. Apparatus as in claim 1, wherein the content comprises visual content including moving images.

18. Apparatus as in claim 1, wherein the network is a computer network.

19. Apparatus as in claim 18, wherein the network is the Internet.

20. Apparatus as in claim 1, wherein the network is a television network.

21. Apparatus as in claim 1, wherein the network is a wireless communications network.

22. Apparatus as in claim 1, further comprising the node server, the node server comprising:
    means for storing the specified content;
    means for receiving a request to transmit the specified content to the client; and
    means for transmitting the specified content to the client.

23. Apparatus as in claim 22, wherein:
    the core server further comprises:
    means for identifying a network site that will act as a node server for distribution of the specified content; and
        means for providing the specified content to the node server; and
    the node server further comprises means for receiving the specified content from the core server.

24. Apparatus as in claim 22, wherein the core server and the node server are each implemented at least in part in a computer.

25. Apparatus as in claim 22, wherein the node server is implemented at least in part in a television set-top box.

26. Apparatus as in claim 22, wherein the node server is implemented at least in part in a portable device.

27. Apparatus as in claim 22, the system further comprising the client, the client comprising:
    means for transmitting the request for the specified content to the core server;
    means for receiving the identity of the node server from the core server; and
    means for receiving the specified content from the node server.

28. Apparatus as in claim 27, wherein the node server and the client are each implemented at least in part in a television set-top box.

29. Apparatus as in claim 1, further comprising the client, the client comprising:
    means for transmitting the request for the specified content to the core server;
    means for receiving the identity of the node server from the core server; and
    means for receiving the specified content from the node server.

30. Apparatus as in claim 29, wherein the client further comprises means for transmitting a request to the node server to transmit the specified content to the client.

31. Apparatus as in claim 29, wherein the client further comprises:
- means for monitoring the characteristics of the transmission of the specified content from the node server to obtain auditing information regarding the transmission of the specified content from the node server to the client; and
- means for transmitting the auditing information to the core server.

32. Apparatus as in claim 29, wherein the core server and the client are each implemented at least in part in a computer.

33. Apparatus as in claim 29, wherein the client is implemented at least in part in a television set-top box.

34. Apparatus as in claim 29, wherein the client is implemented at least in part in a portable device.

35. Apparatus for effecting the provision of content over a network, comprising a core server, the core server comprising:
- means for receiving a request for content from a client;
- means for determining the location of the client within the network;
- means for identifying the location of a plurality of node servers within the network that have at least part of the requested content stored thereon;
- means for selecting from the plurality of node servers one or more candidate node servers that are determined to be topologically proximate to the client;
- means for communicating the identity of the candidate node servers to the client to enable the client to request transmission of the requested content via the network from one or more of the candidate node servers; and
- means for ascertaining which of the one or more of the candidate node servers transmitted requested content to the client, wherein an owner of such node server is offered an incentive as compensation for transmission of requested content to the client.

36. Apparatus for effecting the provision of content over a network, comprising a core server, the core server comprising:
- means for identifying which of a plurality of sets of content or parts of the plurality of sets of content are stored by each of a plurality of node servers that are part of the network, wherein at least one of the plurality of sets of content or parts of the plurality of sets of content is stored on redundant node servers;
- means for receiving a request from a client that is part of the network for transmission of a set of content to the client, wherein at least part of the requested set of content is stored on redundant node servers;
- means for selecting from the plurality of node servers one or more candidate node servers that have stored thereon at least part of the requested set of content;
- means for communicating the identity of the candidate node servers to the client to enable the client to request transmission of the requested content via the network from one or more of the candidate node servers; and
- means for ascertaining which of the one or more of the candidate node servers transmitted requested content to the client, wherein an owner of such node server is offered an incentive as compensation for transmission of requested content to the client.

37. A computer readable storage medium or media encoded with one or more computer programs including instructions for effecting the provision of content over a network, comprising:
- instructions for receiving a request from a client for specified content;
- instructions for communicating to the client the identity of a node server having the specified content stored thereon, thereby enabling the client to request transmission of the specified content from the node server; and
- instructions for ascertaining that the node server transmitted the specified content to the client, wherein an owner of the node server is offered an incentive as compensation for transmission of the specified content to the client.

38. A computer readable storage medium or media as in claim 37, wherein the instructions for ascertaining that the node server transmitted the specified content to the client further comprise instructions for obtaining information regarding the characteristics of the transmission of the content.

39. A computer readable storage medium or media as in claim 38, wherein the instructions for obtaining information regarding the characteristics of the transmission of the content further comprise instructions for obtaining information regarding when the content was delivered.

40. A computer readable storage medium or media as in claim 38, wherein the instructions for obtaining information regarding the characteristics of the transmission of the content further comprise instructions for obtaining information regarding the bandwidth and/or latency performance associated with the transmission of the content.

41. A computer readable storage medium or media as in claim 37, further comprising:
- instructions for identifying a plurality of node servers within the network that have at least part of the requested content stored thereon;
- instructions for selecting from the plurality of node servers one or more candidate node servers; and
- instructions for communicating the identity of the candidate node servers to the client to enable the client to request transmission of the specified content via the network from one or more of the candidate node servers.

42. A computer readable storage medium or media as in claim 41, further comprising:
- instructions for determining the location of the client within the network;
- instructions for identifying the locations of the plurality of node servers that can act as a node server for distribution of the specified content;
- instructions for identifying the locations of the plurality of node servers that have at least part of the requested content stored thereon;
- wherein the instructions for selecting one or more candidate node servers further comprise instructions for selecting from the plurality of node servers one or more candidate node servers that are determined to be topologically proximate to the client.

43. A computer readable storage medium or media as in claim 42, wherein the determination of topological proximity to the client is performed using a broadth-first search to identify node servers that satisfy a criterion regarding topological proximity to the client.

44. A computer readable storage medium or media as in claim 37, further comprising:
- instructions for identifying a network site that will act as a node server for distribution of the specified content; and
- instructions for providing the specified content to the node server.

45. A computer readable storage medium or media as in claim 44, wherein the instructions for identifying a network site that will act as a node server for distribution of the specified content further comprise:

instructions for identifying the location of a prospective node server that desires to act as a node server for distribution of the specified content;

instructions for identifying the location of one or more other existing node servers that can act as a node server for distribution of the specified content; and instructions for determining the topological proximity of the prospective node server to the existing node servers, wherein the prospective node server is selected as a node server for distribution of the specified content if the prospective node server satisfies a criterion regarding topological proximity to the existing node servers.

46. A computer readable storage medium or media as in claim 45, wherein the instructions for determining the topological proximity of the prospective node server to the existing node servers comprise instructions for performing an annealing method.

47. A computer readable storage medium or media as in claim 37, further comprising:

instructions for storing data identifying available sets of content that can be obtained by a client; and instructions for providing an identification of available sets of content to the client.

48. A computer readable storage medium or media as in claim 37, further comprising instructions for storing data identifying the location of the node server.

49. A computer readable storage medium or media as in claim 37, further comprising:

instructions for storing content at a node server;

instructions for receiving a request at a node server to transmit content to a client; and instructions for transmitting content from a node server to a client in response to a request for that content.

50. A computer readable storage medium or media as in claim 49, further comprising:

instructions for identifying a network site that will act as a node server for distribution of the specified content;

instructions for providing the specified content to the node server; and instructions for receiving at the node server the specified content provided by the core server.

51. A computer readable storage medium or media as in claim 49, further comprising:

instructions for transmitting from the client a request for specified content to the core server;

instructions for receiving at the client the identity of a node server from the core server; and instructions for receiving at the client the specified content from a node server.

52. A computer readable storage medium or media as in claim 37, further comprising:

instructions for transmitting from the client a request for specified content to the core server;

instructions for receiving at the client the identity of a node server from the core server; and instructions for receiving at the client the specified content from a node server.

53. A computer readable storage medium or media as in claim 52, further comprising instructions for transmitting a request from the client to the node server to transmit specified content to the client.

54. A computer readable storage medium or media as in claim 52, further comprising:

instructions for monitoring the characteristics of the transmission of the specified content from the node server to obtain auditing information regarding the transmission of the specified content from the node server to the client; and instructions for transmitting the auditing information to the core server.

55. A computer readable storage medium or media encoded with one or more computer programs including instructions for effecting the provision of content over network, comprising:

instructions for receiving a request for content from a client;

instructions for determining the location of the client within the network;

instructions for identifying the location of a plurality of node servers within the network that have at least part of the requested content stored thereon;

instructions for selecting from the plurality of node servers one or more candidate node servers that are determined to be topologically proximate to the client;

instructions for communicating the identity of the candidate node server to the client to enable the client to request transmission of the requested content via the network from one or more of the candidate node servers; and instructions for ascertaining which of the one or more of the candidate node servers transmitted requested content to the client, wherein an owner of such node server is offered an incentive as compensation for transmission of requested content to the client.

56. A computer readable storage medium or media encoded with one or more computer programs including instructions for effecting the provision of content over a network, comprising:

instructions for identifying which of a plurality of sets of content or parts of the plurality of sets of content are stored by each of a plurality of node servers that are part of the network, wherein at least one of the plurality of sets of content or parts of the plurality of sets of content is stored on redundant node servers;

instructions for receiving a request from a client that is part of the network for transmission of a set of content to the client, wherein at least part of the requested set of content is stored on redundant node servers;

instructions for selecting from the plurality of node servers one or more candidate node servers that have stored thereon at least part of the requested set of content;

instructions for communicating the identity of the candidate node servers to the client to enable the client to request transmission of the requested content via the network from one or more of the candidate node servers; and instructions for ascertaining which of the one or more of the candidate node servers transmitted requested content to the client, wherein an owner of such node server is offered an incentive as compensation on for transmission of requested content to the client.

57. A method for effecting the provision of content over a network, comprising the steps of:

identifying at a core server a network site that will act as a node server for distribution of specified content;

providing from the core server the specified content to the node server;

receiving at the core server a request from a client for the specified content;

communicating from the core server the identity of the node server to the client to enable the client to request transmission of the specified content from the node server; and ascertaining at the core server that the node server transmitted the specified content to the client, wherein an owner of the node server is offered an incentive as compensation for transmission of the specified content to the client.

58. A method as in claim 57, wherein the incentive varies in accordance with the bandwidth and/or latency performance of the node server in transmitting the specified content to the client.

59. A method as in claim 58, wherein the incentive varies in accordance with the bandwidth and/or latency performance of the node server relative to the bandwidth and/or latency characteristics of one or more other node servers that can provide the specified content to the client.

60. A method as in claim 57, wherein the incentive varies in accordance with the number and/or topological proximity of one or more other node servers that can provide the specified content to the client.

61. A method as in claim 57, wherein the incentive varies in accordance with the time of day at which the node server transmits the specified content to the client.

62. A method as in claim 57, wherein the step of ascertaining at the core server that the node server transmitted the specified content to the client comprises the step of obtaining at the core server information regarding the characteristics of the transmission of the content.

63. A method as in claim 62, wherein the step of obtaining information at the core server regarding the characteristics of the transmission of the content comprises the step of obtaining information at the core server regarding when the content was delivered.

64. A method as in claim 62, wherein the step of obtaining information at the core server regarding the characteristics of the transmission of the content comprises the step of obtaining information at the core server regarding the bandwidth and/or latency performance associated with the transmission of the content.

65. A method as in claim 57, further comprising the steps of:
    identifying at the core server a plurality of node servers within the network that can act as a node server for distribution of the specified content;
    selecting by the core server from the plurality of node servers one or more candidate node servers; and
    communicating from the core server the identity of the candidate node servers to the client to enable the client to request transmission of the specified content via the network from one of the candidate node servers.

66. A method as in claim 65, further comprising the steps of:
    determining by the core server the location of the client within the network;
    identifying at the core server the locations of the plurality of node servers that can act as a node server for distribution of the specified content; and
    wherein the step of selecting by the core server one or more candidate node servers comprises the step of selecting by the core server from the plurality of node servers one or more candidate node servers that are determined to be topologically proximate to the client.

67. A method as in claim 66, wherein the determination of topological proximity to the client is performed using a breadth-first search to identify node servers that satisfy a criterion regarding topological proximity to the client.

68. A method as in claim 57, wherein the step of identifying a network site that will act as a node server for distribution of the specified content further comprises the steps of:
    identifying at the core server the location of a prospective node server that desires to act as a node server for distribution of the specified content;
    identifying at the core server the location of one or more other existing node servers that can act as a node server for distribution of the specified content;
    determining by the core server the topological proximity of the prospective node server to the existing node servers, wherein the prospective node server is selected as a node server for distribution of the specified content if the prospective node server satisfies a criterion regarding topological proximity to the existing node servers.

69. A method as in claim 68, wherein the step of determining the topological proximity of the prospective node server to the existing node servers is performed using an annealing method.

70. A method as in claim 57, further comprising the steps of:
    storing at the core server data identifying available content that can be obtained by a client; and
    providing from the core server an identification of available content to the client.

71. A method as in claim 57, further comprising the step of storing at the core server data identifying the location of the node server.

72. A method as in claim 57, wherein the content comprises visual content including moving images.

73. A method as in claim 57, wherein the network is a computer network.

74. A method as in claim 73, wherein the network is the Internet.

75. A method as in claim 57, wherein the network is a television network.

76. A method as in claim 57, wherein the network is a wireless communications network.

77. A method as in claim 57, further comprising the steps of:
    storing at the node server the specified content;
    receiving at the node server a request to transmit the specified content to the client; and
    transmitting from the node server the specified content to the client.

78. A method as in claim 77, further comprising the step of receiving at the node server the specified content from the core server.

79. A method as in claim 78, further comprising the steps of:
    transmitting from a client the request for the specified content to the core server;
    receiving at the client the identity of the node server from the core server; and
    receiving at the client the specified content from the node server.

80. A method as in claim 79, wherein the steps performed by the node server and the steps performed by the client are each implemented, at least in part, in a television set-top box.

81. A method as in claim 77, wherein the steps performed by the core server and the steps performed by the node server are each implemented, at least in part, in a computer.

82. A method as in claim 77, wherein the steps performed by the node server are implemented, at least in part, in a television set-top box 83. A method as in claim 77, wherein the steps performed by the node server are implemented, at least in part, in a portable device.

84. A method as in claim 57, further comprising the following steps of:
transmitting from the client the request for the specified content to the core server;
receiving at the client the identity of the node server from the core server; and
receiving at the client the specified content from the node server.

85. A method as in claim 84, the further comprising the step of transmitting from the client a request to the node server to transmit the specified content to the client.

86. A method as in claim 84, further comprising the steps of:
monitoring by the client the characteristics of the transmission of the specified content from the node server to obtain auditing information regarding the transmission of
the specified content from the node server to the client; and
transmitting from the client the auditing information to the core server.

87. A method as in claim 84, wherein the steps performed by the core server and the steps performed by the client are each implemented, at least in part, in a computer.

88. A method as in claim 84, wherein the steps performed by the client are implemented, at least in part, in a television set-top box.

89. A method as in claim 84, wherein the steps performed by the client are implemented, at least in part, in a portable device.

90. Apparatus for effecting the provision of content over a network, comprising a core server, the core server comprising:
a receiver, wherein:
the receiver is adapted to receive a request from a client for specified content; and
the receiver is adapted to receive an identification of a node server that transmitted the specified content to the client, wherein an owner of the node server so identified is offered an incentive as compensation for transmission of the specified content to the client; and
a transmitter, wherein the transmitter is adapted to communicate to the client the identity of a node server having the specified content stored thereon, thereby enabling the client to request transmission of the specified content from the node server so identified.

91. Apparatus as in claim 90, wherein the incentive varies in accordance with the bandwidth and/or latency performance of the node server in transmitting the specified content to the client.

92. Apparatus as in claim 91, wherein the incentive varies in accordance with the bandwidth and/or latency performance of the node server relative to the bandwidth and/or latency characteristics of one or more other node servers that can provide the specified content to the client.

93. Apparatus as in claim 90, wherein the incentive varies in accordance with the number and/or topological proximity of one or more other node servers that can provide the specified content to the client.

94. Apparatus as in claim 90, wherein the incentive varies in accordance with the time of day at which the node server transmits the specified content to the client.

95. Apparatus as in claim 90, the core server further comprising computational apparatus, wherein the receiver, transmitter and/or computational apparatus are further adapted to obtain information regarding the characteristics of the transmission of the content.

96. Apparatus as in claim 95, wherein the information regarding the characteristics of the transmission of the content comprises information regarding when the content was delivered.

97. Apparatus as in claim 95, wherein the information regarding the characteristics of the transmission of the content comprises information regarding the bandwidth and/or latency performance associated with the transmission of the content.

98. Apparatus as in claim 90, wherein:
the receiver is further adapted to receive an identification of a plurality of node servers within the network that can act as a node server for distribution of the specified content;
the core server further comprises computational apparatus adapted to select from the plurality of node servers one or more candidate node servers; and
the transmitter is further adapted to communicate the identity of the candidate node servers to the client to enable the client to request transmission of the specified content via the network from one of the candidate node servers.

99. Apparatus as in claim 98, wherein:
the receiver is further adapted to receive an identification of the locations of the plurality of node servers that can act as a node server for distribution of the specified content;
the receiver, transmitter and/or computational apparatus are further adapted to determine the location of the client within the network; and
the computational apparatus is further adapted to select from the plurality of node servers one or more candidate node servers that are determined to be topologically proximate to the client.

100. Apparatus as in claim 99, wherein the determination of topological proximity to the client is performed using a breadth-first search to identify node servers that satisfy a criterion regarding topological proximity to the client.

101. Apparatus as in claim 90, the core server further comprising computational apparatus, wherein the receiver, transmitter and/or computational apparatus are adapted to identify a network site that will act as a node server for distribution of the specified content, and wherein the transmitter is further adapted to provide the specified content to the node server.

102. Apparatus as in claim 101, wherein the computational apparatus is further adapted to i) identify the location of a prospective node server that desires to act as a node server for distribution of the specified content; ii) identify the location of one or more other existing node servers that can act as a node server for distribution of the specified content; iii) determine the topological proximity of the prospective node server to the existing node servers, wherein the prospective node server is selected as a node server for distribution of the specified content if the prospective node server satisfies a criterion regarding topological proximity to the existing node servers.

103. Apparatus as in claim 102, wherein the determination of the topological proximity of the prospective node server to the existing node servers is performed using an annealing method.

104. Apparatus as in claim 90, the core server further comprising data storage apparatus for storing data identifying available content that can be obtained by a client, and wherein the transmitter is further adapted to provide an identification of available content to the client.

105. Apparatus as in claim 90, the core server further comprising data storage apparatus for ˆUˆˆring data identifying the location of the node server.

106. Apparatus as in claim 90, wherein the content comprises visual content including moving images.

107. Apparatus as in claim 90, wherein the network is a computer network.

108. Apparatus as in claim 107, wherein the network is the Internet.

109. Apparatus as in claim 90, wherein the network is a television network.

110. Apparatus as in claim 90, wherein the network is a wireless communications network.

111. Apparatus as in claim 90, further comprising the node server, the node server comprising:
  data storage apparatus for storing the specified content;
  a receiver adapted to receive a request to transmit the specified content to the client; and
  a transmitter adapted to transmit the specified content to the client.

112. Apparatus as in claim 11, wherein:
  the core server further comprises computational apparatus adapted to identify a network site that will act as a node server for distribution of the specified content, and wherein the transmitter of the core server is further adapted to provide the specified content to the node server; and
  the receiver of the node server is further adapted to receive the specified content from the core server.

113. Apparatus as in claim 111, wherein the core server and the node server are each implemented, at least in part, in a computer.

114. Apparatus as in claim 111, wherein the node server is implemented, at least in part, in a television set-top box.

115. Apparatus as in claim 111, wherein the node server is implemented, at least in part, in a portable device.

116. Apparatus as in claim 111, further comprising the client, the client comprising:
  a transmitter adapted to transmit the request for the specified content to the core server;
  a receiver adapted to receive the identity of the node server from the core server and to receive the specified content from the node server.

117. Apparatus as in claim 116, wherein the node server and the client are each implemented, at least in part, in a television set-top box.

118. Apparatus as in claim 90, further comprising the client, the client comprising:
  a transmitter adapted to transmit the request for the specified content to the core server;
  a receiver adapted to receive the identity of the node server from the core server and to receive the specified content from the node server.

119. Apparatus as in claim 118, wherein the transmitter or the client is further adapted to transmit a request to the node server to transmit the specified content to the client.

120. Apparatus as in claim 118, wherein the client further comprises computational apparatus, wherein the receiver, transmitter and/or computational apparatus of the client are adapted to monitor the characteristics of the transmission of the specified content from the node server to obtain auditing information regarding the transmission of the specified content from the node server to the client, and wherein the transmitter of the client is further adapted to transmit the auditing information to the core server.

121. Apparatus as in claim 118, wherein the core server and the client are each implemented, at least in part, in a computer.

122. Apparatus as in claim 118, wherein the client is implemented, at least in part, in a television set-top box.

123. Apparatus as in claim 122, wherein the client is implemented, at least in part, in a portable device.

* * * * *